Oct. 18, 1966     E. J. STEPSHINSKI     3,279,080
GANG OUTLET TEMPLATE
Filed June 8, 1964
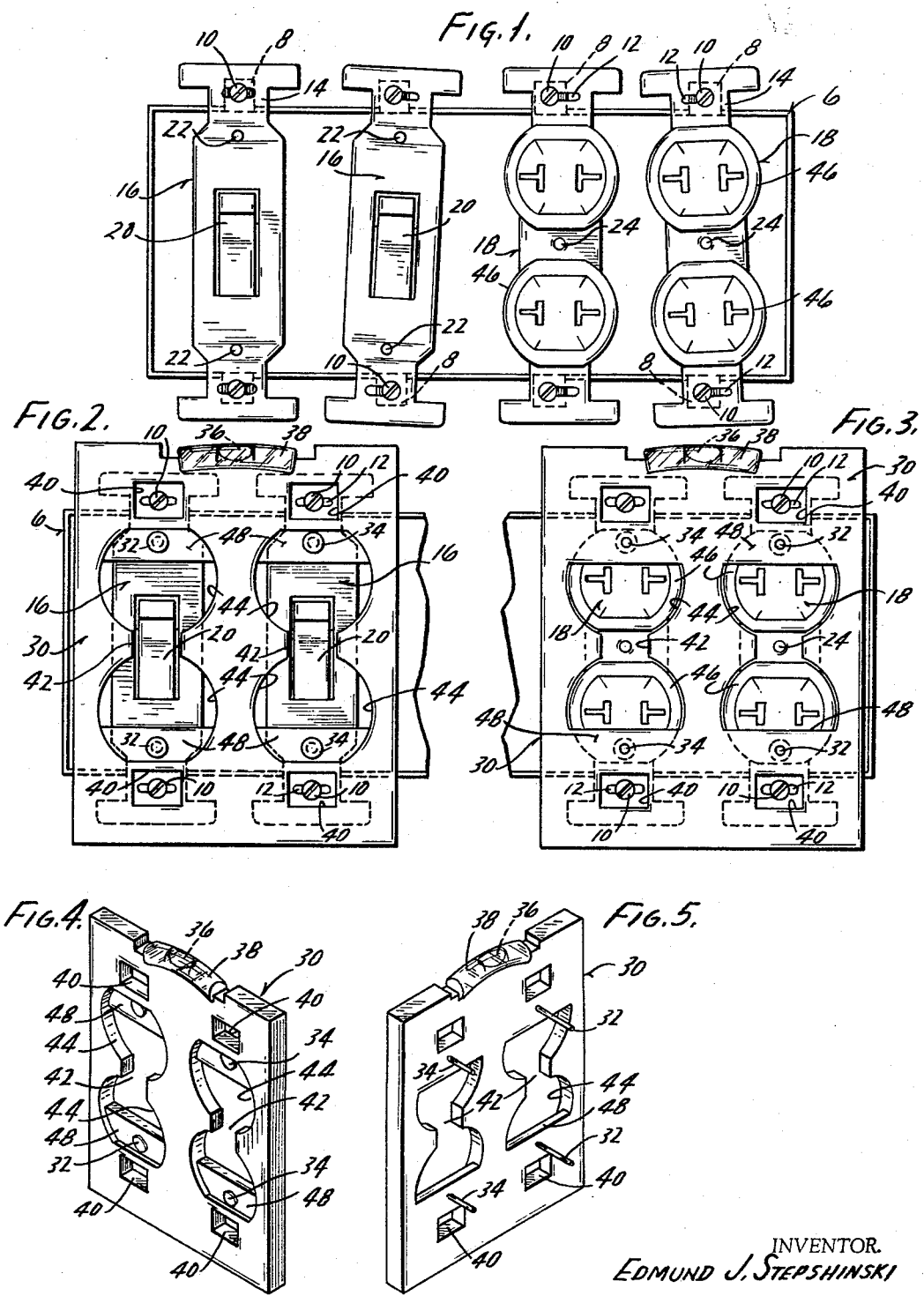
INVENTOR.
EDMUND J. STEPSHINSKI
BY
*Wheeler Wheeler and Wheeler*
ATTORNEYS.

3,279,080
GANG OUTLET TEMPLATE
Edmund J. Stepshinski, Box 156, Three Lakes, Wis.
Filed June 8, 1964, Ser. No. 373,446
2 Claims. (Cl. 33—174)

This invention relates to a gang outlet template.

When multiple outlet fixtures or switch fixtures are assembled in a common outlet box to register with the slots of a cover plate for such box, the several brackets are individually connected with the box and it is necessary that the screws for mounting the cover plate must be registered with the tapped hole openings provided in the mounting brackets. This is sometimes a time-consuming operation.

The present invention seeks to facilitate such an installation by the provision of a template which has on one face dowel pins located for precise registry with tapped openings of switch mounting brackets and has on its other face recesses registrable externally with outlet fixtures. Because the outlet and switch fixtures are susceptible of adjustment with respect to the box and because the cover plate is then mounted on the fixtures, it is important that the fixtures be upright in order that the cover plate may be properly positioned. The present invention contemplates the provision of a level on the template. Any desired number of fixtures of either type or both types can all be properly oriented with respect to each other and their respective outlet boxes and covers.

It is desirable, though not a necessary feature of the invention, that one pair of dowels is preferably made longer than the others to serve as a master pair to initiate the aligning operation when the dowels are in use. It is true of the master dowels as well as the other dowels that these are desirably small enough in cross section to pass freely into and from the tapped screw holes without meshing with the threads thereof.

The template is provided with apertures offset from the dowel pins aforesaid in a position such that the screws for mounting the brackets to the outlet box are not only visible through the apertures but can be manipulated through the apertures to facilitate bringing the brackets into the proper position. These apertures expose the screws whether the template has its dowels engaged with switch fixtures or has the recesses in its other face engaged with outlet fixtures.

In the drawings:

FIG. 1 is a front elevational view of a box having two switch fixtures and two outlet fixtures mounted thereon and requiring adjustment.

FIG. 2 is a front elevation fragmentarily illustrating such a box and showing a template embodying this invention as it appears when applied over the box and the switch fixtures.

FIG. 3 is a view similar to FIG. 2 showing a template embodying the present invention as it appears in front elevation when applied to the outlet fixtures at the other end of the box.

FIG. 4 is a view on a reduced scale showing the template per se as it appears when one face is viewed in three-quarter perspective.

FIG. 5 is a view similar to FIG. 4 showing the other face of the template as viewed in three-quarter perspective.

In the typical installation shown in FIGS. 1 to 3, the outlet box 6 has outwardly turned marginal ears at 8 tapped to receive screws 10 which are disposed in the slots 12 of the brackets 14 at the ends of switch fixtures 16 and outlet fixtures 18. The switch fixtures are of conventional type having toggle levers 20. In the case of the switch fixtures 16, there are tapped openings at 22 to receive the screws for anchoring the cover plate (not shown). In the case of the outlet fixtures 18, the tapped openings centrally disposed at 24 receive the cover plate anchorage screws.

The switch and outlet fixtures 16 and 18 are mounted on the box 6 by means of screws 10, the screws being left loose, temporarily, to facilitate proper positioning of the fixtures. In positioning a switch fixture or pair of such fixtures, the template 30 is applied over the fixtures in a manner such as to engage its pins 32 and 34 successively in the appropriate openings 22. The greater length of the pins 32 makes it possible to engage these pins first and then to manipulate the engaged fixture along with the template in so orienting the parts that the pins 34 may be engaged in the other fixture of the pair of fixtures over which the template is applied.

With the single pins engaged in the several apertures of both fixtures of the pair, the template is then bodily manipulated along with the engaged fixtures, until the bubble 36 in the level vial 38 shows that the template is transversely leveled. When the template is level, the fixtures are necessarily upright. The apertures 40 in the template 30 expose the fixture mounting screws 10, as clearly shown in FIG. 2. Accordingly, these screws may now be tightened to hold the respective fixtures in the upright positions to which they have been adjusted with the assistance of the level 38. The central openings 42 expose the switch operating levers 20 so that these do not interfere with the use of the template.

As clearly shown in FIG. 4, the template comprises recesses at 44 so dimensioned and spaced that when the template is inverted from the position of FIG. 2 to the position in FIG. 3, the recesses will receive and engage the margins 46 of the outlet fixtures 18. Thus, by manipulating the template over the fixtures 18 until the fixtures are received into the respective recesses 44 which conform thereto, and by then manipulating the template 30 and fixtures 18 concurrently until the fixtures are upright as indicated by the bubble 36 of the level vial 38, it is possible to use the template to position the fixtures 18 notwithstanding that fixtures 18 have no openings into which the dowel pins 32, 34 are receivable.

As appears in FIG. 4, the recesses 44 which receive the outlet fixtures 18 are not cut completely through the template but are spanned by webs 48 which mount the locating dowels 32 and 34.

I claim:

1. A template for positioning an outlet fixture on an outlet box having ears provided with tapped holes for mounting screws, said template being of substantial thickness and having opposing faces, one of which is provided with spaced recesses adapted to accommodate and shaped to fit outlet fixtures to position them on said box, the portions of said recesses which are proximate each other being open completely through the template and connected by a slot shaped to position a switch toggle, while the portions of said recesses which are remote from each other are spanned by webs at one face of the template, the webs being offset from the other face of the template to provide recesses of sufficient depth to receive the said outlet fixtures, each said web carrying a positioning dowel projecting from that face of the template at which the respective webs are located, the template having openings so disposed as to give access to the said mounting screws.

2. A template according to claim 1 in combination with a leveling vial exposed at both said faces of the template, said faces being spaced at least approximately by an amount equal to the thickness of the vial and the vial being on an edge of the template which has a margin provided with a notch to which the vial conforms and in which it is disposed between said faces.

References Cited by the Examiner
UNITED STATES PATENTS

| | | | |
|---|---|---|---|
| 212,353 | 2/1879 | Card | 33—174 |
| 1,795,363 | 3/1931 | Cunningham | 269—37 X |
| 2,649,157 | 8/1953 | Weisbeck | 33—174 |
| 3,116,563 | 1/1964 | Gelbman | 33—174 |
| 3,123,918 | 3/1964 | Crabtree | 33—180 X |

ROBERT B. HULL, *Primary Examiner.*
LEONARD FORMAN, *Examiner.*